(12) United States Patent
Nave et al.

(10) Patent No.: US 7,525,756 B2
(45) Date of Patent: Apr. 28, 2009

(54) ACCESSOR AND RAILS FOR A DATA STORAGE LIBRARY

(75) Inventors: Shawn M. Nave, Tucson, AZ (US); Jeffrey L. Thorn, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 11/140,629

(22) Filed: May 27, 2005

(65) Prior Publication Data

US 2006/0268450 A1 Nov. 30, 2006

(51) Int. Cl.
*G11B 17/22* (2006.01)
*G11B 15/68* (2006.01)

(52) U.S. Cl. .................... 360/92.1; 369/30.45
(58) Field of Classification Search ................ 360/92.1; 369/30.45, 30.57; 720/632
See application file for complete search history.

(56) References Cited

U.S. PATENT DOCUMENTS

| | | | |
|---|---|---|---|
| 5,546,366 A * | 8/1996 | Dang .................. | 369/30.39 |
| 5,631,785 A * | 5/1997 | Dang et al. ............ | 360/92.1 |
| 5,818,723 A * | 10/1998 | Dimitri .................. | 700/214 |
| 5,940,356 A * | 8/1999 | Toumbas ................ | 369/30.39 |
| 6,262,863 B1 * | 7/2001 | Ostwald et al. ........... | 360/92.1 |
| 6,433,947 B1 * | 8/2002 | Tadokoro et al. .......... | 360/69 |
| 6,690,994 B1 * | 2/2004 | Smith et al. .............. | 700/218 |
| 6,707,636 B2 * | 3/2004 | Coffin et al. .............. | 360/92.1 |
| 6,754,037 B1 | 6/2004 | Ostwald et al. | |
| 6,791,788 B2 * | 9/2004 | Gustafson et al. ......... | 360/92.1 |
| 2003/0123184 A1 | 7/2003 | Ostwald et al. | |
| 2007/0131630 A1 * | 6/2007 | Thorn et al. ............. | 211/41.12 |

FOREIGN PATENT DOCUMENTS

EP 1063646 A2 12/2000

* cited by examiner

*Primary Examiner*—Brian E Miller

(57) ABSTRACT

Data storage libraries as disclosed that provide for accessors that turn upon angled rails. In the library, a first rail and a second rail form an angle. The first and second rail each have a drive surface, but the drive surfaces are on different vertical planes. A switching mechanism of the accessor is then configured to move a drive mechanism between the different vertical planes of the drive surfaces. If the switching mechanism positions the drive mechanism adjacent to the drive surface of the first rail, then the drive mechanism engages the drive surface of the first rail to move the accessor along the first rail. If the switching mechanism switches the position of the drive mechanism adjacent to the drive surface of the second rail, then the drive mechanism engages the drive surface of the second rail to move the accessor along the second rail.

1 Claim, 15 Drawing Sheets

ACCESSOR AND RAILS FOR A DATA STORAGE LIBRARY

BACKGROUND OF THE INVENTION

1. Field of the Invention

The invention relates to the field of data storage libraries and, in particular, to improved accessors and rails for data storage libraries.

2. Statement of the Problem

Data storage libraries provide a cost effective way of storing large amounts of data. Data storage libraries may use magnetic tape, magnetic disks, optical tape, optical disk, etc, as the storage media for data. A data storage library that uses magnetic tape is referred to as a tape library. A typical tape library includes a plurality of storage shelves for storing tape cartridges. The tape library may vary in size from storing a few tape cartridges to storing thousands of tape cartridges. The storage shelves comprise multiple columns and rows of storage slots for storing tape cartridges. The tape cartridges are readable and writeable by one or more tape drives in the tape library. One or more robotic accessors are used to transport tape cartridges between the storage shelves and the tape drives. Accessors are also referred to as robotic pickers, robotic arms, etc. The movements of the accessors are controlled by a library control unit.

To access a selected file stored in the tape library, a host computer contains information from which it can map a particular file to the tape cartridge on which the file is stored. The host computer transmits a command to the tape drive. The tape drive then transmits the command to the library control unit. Under control of the library control unit, an accessor is operable to locate a particular tape cartridge on the storage shelves, retrieve the tape cartridge from a storage shelf, transport the tape cartridge to a tape drive, and insert the tape cartridge into the tape drive. The tape drive then reads data from or writes data to the magnetic tape of the tape cartridge. After use of the tape cartridge is finished, the accessor is operable to remove the tape cartridge from the tape drive, transport the tape cartridge to the appropriate storage shelf, and return the appropriate tape cartridge to the storage shelf.

FIG. 1 illustrates a tape library 100 comprising a single storage frame 102 in the prior art. A storage frame comprises a section or module having a certain number of storage shelves having slots to store media cartridges, such as tape cartridges. Storage frame 102 includes a plurality of storage shelves 104-105 having slots for storing tape cartridges. Storage shelves 104 are on a front wall of storage frame 102, and storage shelves 105 are on a back wall of storage frame 102. Storage frame 102 also includes a plurality of tape drives 106 for reading data from or writing data to the tape cartridges stored in the storage shelves 104-105. Storage frame 102 also includes an accessor 108.

Accessor 108 is operable to transport tape cartridges between the storage shelves 104-105 and the tape drives 106. Accessor 108 comprises a gripper assembly 112 for gripping one or more tape cartridges and transporting the tape cartridges between the storage shelves 104-105 and tape drives 106. The gripper assembly 112 is mounted to a vertical rail 114 (also referred to as a Y-rail) and may be moved to different vertical positions on the Y-rail 114 via a Y-rail drive 116 to access tape cartridges on different rows of the storage shelves 104-105. The Y-rail drive 116 may comprise a motor turning a lead screw. The vertical rail 114 and gripper assembly 112 may be transported horizontally along a horizontal rail 118 (also referred to as an X-rail) by an X-rail drive 120. The X-rail 118 is mounted between the storage shelves 104-105 to allow the accessor 108 to travel between the storage shelves 104-105. The gripper assembly 112 may rotate approximately 180 degrees via a rotational drive 122 to access the storage shelves 104 on the front wall, and the storage shelves 105 and tape drives 106 on the rear wall.

FIG. 2 illustrates an X-rail drive 120 for accessor 108 in the prior art. The other elements of accessor 108 are not shown, but would be connected to X-rail drive 120 and would extend upward out of the top of page in FIG. 2. X-rail drive 120 includes a drive motor 202 connected to a drive pulley 204 via a belt 206. Drive pulley 204 is connected to a pinion (not visible) by a shaft. The pinion engages a rack 210 of X-rail 118. When drive motor 202 turns drive pulley 204, drive pulley 204 turns the pinion on rack 210 to move accessor 108 in the X-direction. Guide rollers 216 for X-rail drive 120 engage a guide rod 218 of X-rail 118 to guide accessor 108 when moving in the X-direction.

FIG. 3 illustrates a tape library 300 comprising multiple storage frames 102 in the prior art. In order to increase the size of tape library 100, additional storage frames 102 are bolted onto the original storage frame 102 (see FIG. 1) to form a linear chain of storage frames 102. Tape library 300 formed of multiple storage frames 102 may include at least two accessors.

FIG. 4 is a top view of tape library 300 in the prior art. In FIG. 4, the storage frames 102 are connected side-by-side to form a linear chain. The storage shelves 104-105 are aligned respectively to form two rows of storage shelves. The X-rails 118 for each storage frame 102 are connected to one another so that the accessors (ACC) 108 (shown in FIG. 4 as boxes for illustrative purposes) may share a common X-rail 118 and access tape cartridges in any of the storage frames 102.

One problem with the tape library 300 shown in FIGS. 3-4 is that the tape library 300 can only grow in one linear direction. The tape library 300 thus has a long, narrow footprint that may not work for the room or building housing the tape library 100. One major limitation in how a tape library can grow is the X-rail 118 and the X-rail drive 120 of the accessor 108. Due to the configuration of the X-rail drive 120, the X-rail 118 needs to be a continuous rail and cannot branch off at angles, such as right angles. If an X-rail 118 were built with an angle, the X-rail drive 120 would not be able to negotiate the angle. Therefore, if the X-rail 118 needs to be continuous, then the shape of the tape library 300 is limited to a straight line, or a curved or circular configuration.

Another problem with the configuration of tape library 300 is that a maximum number of two accessors 108 can be used. If either accessor 108 in FIG. 4 becomes disabled, the other accessor can push the disabled accessor to one end of tape library 300 and out of the way. If a third accessor were to be added to tape library 300 and the middle accessor became disabled, then the disabled accessor would hinder access to certain storage shelves 104-105.

FIG. 5 is a top view of a single U-shaped storage frame 502 in the prior art. The U-shaped storage frame 502 includes outside storage shelves 504 and inside storage shelves 505. An accessor 508 is operable to access tape cartridges in storage shelves 504-505 by traveling along U-shaped rail 510. By using a U-shaped storage frame 502, the tape library can grow in two dimensions.

FIG. 6 is a top view of a tape library 600 using multiple U-shaped storage frames 502 in the prior art. To expand in one direction, other storage frames 602 may be bolted onto the legs of the U-shaped storage frame 502 to expand the tape library 600. The accessor 508 for U-shaped storage frame 502 can access the other storage frames 602 bolted onto the end of storage frame 502. To expand in another direction, multiple U-shaped storage frames 502 can be connected side-by-side with a pass-through mechanism 610.

There are multiple problems with this configuration. The U-shaped storage frame 502 has a large radius in the corners of the "U" which allows the accessor 508 to turn. However, the large curved areas make a region where tape cartridge density is sacrificed as rectangular tape cartridges cannot be most efficiently packed around a curve. Another problem is that the accessors 508 in one U-shaped storage frame 502 cannot access tape cartridges stored in another U-shaped storage frame 502, except through a pass-through mechanism 610. It is inefficient to use the pass-through mechanism 610 to pass tape cartridges from one U-shaped storage frame 502 to another, as several different accessors 508 need to handle the tape cartridges.

It would therefore be desirable to design a tape library, or other types of data storage libraries, that have angled rails and accessors that can negotiate the angled rails.

SUMMARY OF THE SOLUTION

The present invention solves the above and other related problems with a data storage library that has angled rails and accessors that can negotiate the angled rails. For the rails of the data storage library, the data storage library includes at least a first rail and a second rail. The second rail is oriented at an angle with the first rail, such as a right angle or any other desired angle. The first rail and the second rail each have a drive surface, which may be located on the side of each rail. The drive surface of the first rail has a longitudinal axis X, and the drive surface of the second rail has a corresponding longitudinal axis Z. There also exists a perpendicular axis Y that is common to the rails and perpendicular to the longitudinal axis X and the longitudinal axis Z.

In this embodiment, the longitudinal axis X of the drive surface of the first rail is at a different position on the perpendicular axis Y than the longitudinal axis Z of the drive surface of the second rail. For instance, if the rails were configured horizontally, then the drive surface of the first rail may be described as having a vertical position that is higher on the perpendicular axis Y than the vertical position of the drive surface of the second rail. The data storage library may include multiple other rails that have a similar configuration as the second rail in relation to the first rail.

For the accessor of the data storage library, the accessor includes a base, a drive system, and a switching mechanism. The drive system includes a drive motor or some other drive means that rotates or otherwise drives a drive mechanism. The drive system is moveable upon the base. The switching mechanism is affixed to the drive system and the base, and is configured to move the drive system along the perpendicular axis Y.

In operation, movement of the accessor may be switched from the first rail to the second rail (and vice-versa) responsive to the positioning of the drive mechanism on the perpendicular axis Y by the switching mechanism. For instance, if the switching mechanism positions the drive mechanism at a first position on the Y axis adjacent to the drive surface of the first rail, then the drive mechanism may engage the drive surface of the first rail to move the accessor along the first rail. If the accessor needs to move along the second rail, then the switching mechanism switches the position of the drive mechanism to a second position on the Y axis that is adjacent to the drive surface of the second rail. The drive mechanism may then engage the drive surface of the second rail to move the accessor along the second rail. The movement of the drive mechanism between the drive surfaces of the rails advantageously allows the accessor to turn on angles.

The angled rails and the accessors having the ability to turn angled corners and switch rails provide many advantages. First, the data storage library may grow in two dimensions, instead of just linearly as in the prior art. For instance, the data storage library may comprise a linear chain of storage frames, with branches of storage frames expanding off of the linear chain. The data storage library having this topology may better suit the rooms or buildings housing the data storage library.

The capability of the accessors to switch rails also allows the accessors to pass one another along the rails. Because the data storage library has multiple branches in this topography, any accessor can advantageously move itself out of the way in one of the branches to allow other accessors to access any cartridge in the data storage library without a pass-through mechanism. Therefore, more than one accessor may be used in the data storage library.

The switching mechanism for switching rails is advantageously implemented in the accessor. The switching mechanism is a possible point of failure in a data storage library. If the switching mechanism in one accessor fails, that accessor can be pushed out of the way or removed from the data storage library. Other accessors would still be able to operate within the data storage library. If the switching mechanism was implemented in the switching rails themselves, a failure in the switching mechanism would affect all accessors of the data storage library.

The density of the storage shelves in each storage frame may also be increased. The capability of the accessors to switch rails also allows the storage slots of the storage shelves to be put very close together (back-to-back) where if a large turning radius was required, more spacing would be required. This advantageously allows the cartridge density of data storage library to increase.

The invention may include other exemplary embodiments described below.

DESCRIPTION OF THE DRAWINGS

The same reference number represents the same element on all drawings.

DETAILED DESCRIPTION OF THE INVENTION

FIGS. 7-16 and the following description depict specific exemplary embodiments of the present invention to teach those skilled in the art how to make and use the best mode of the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
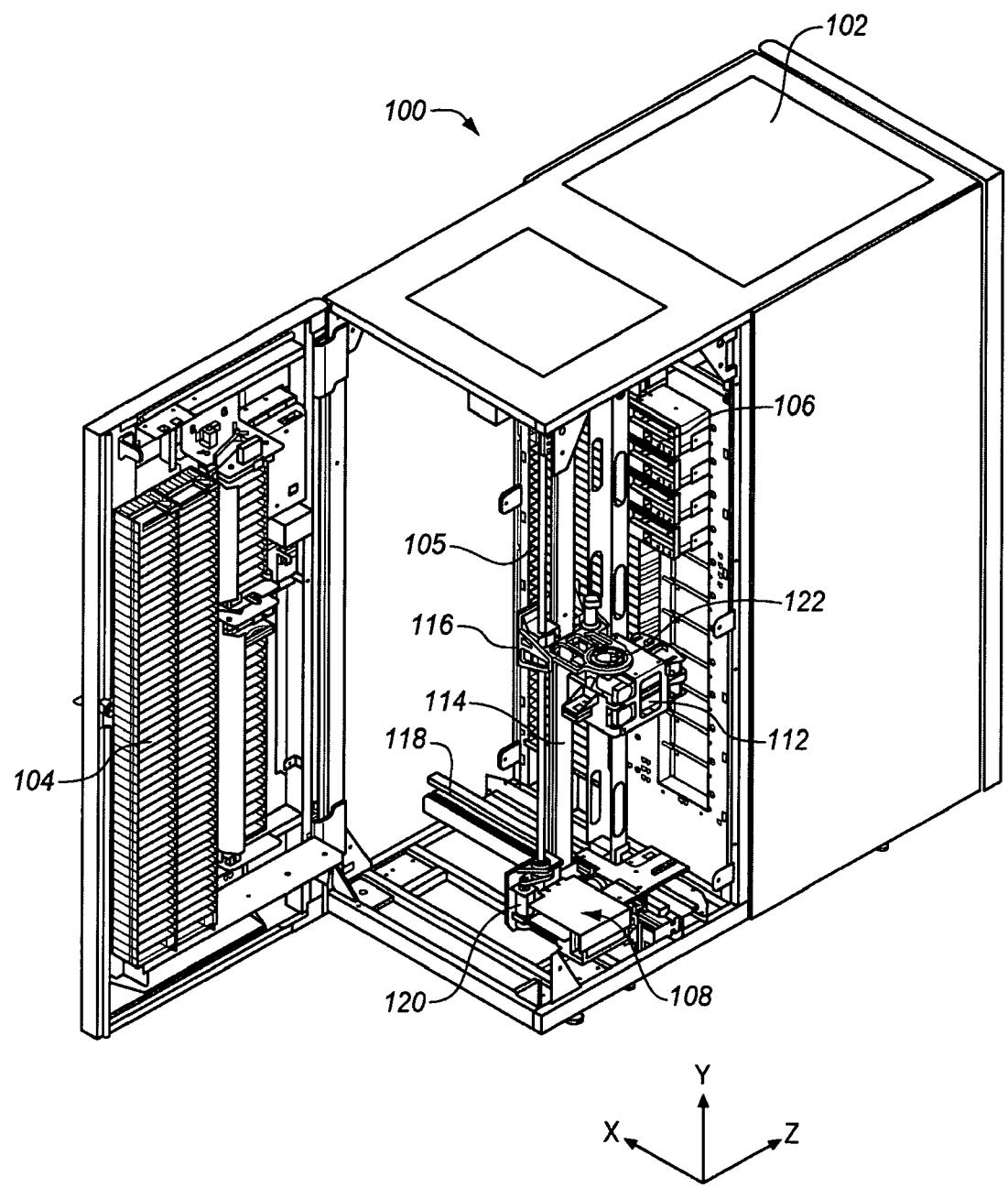
FIG. 1 illustrates a tape library comprising a single storage frame in the prior art.
Figure 7:
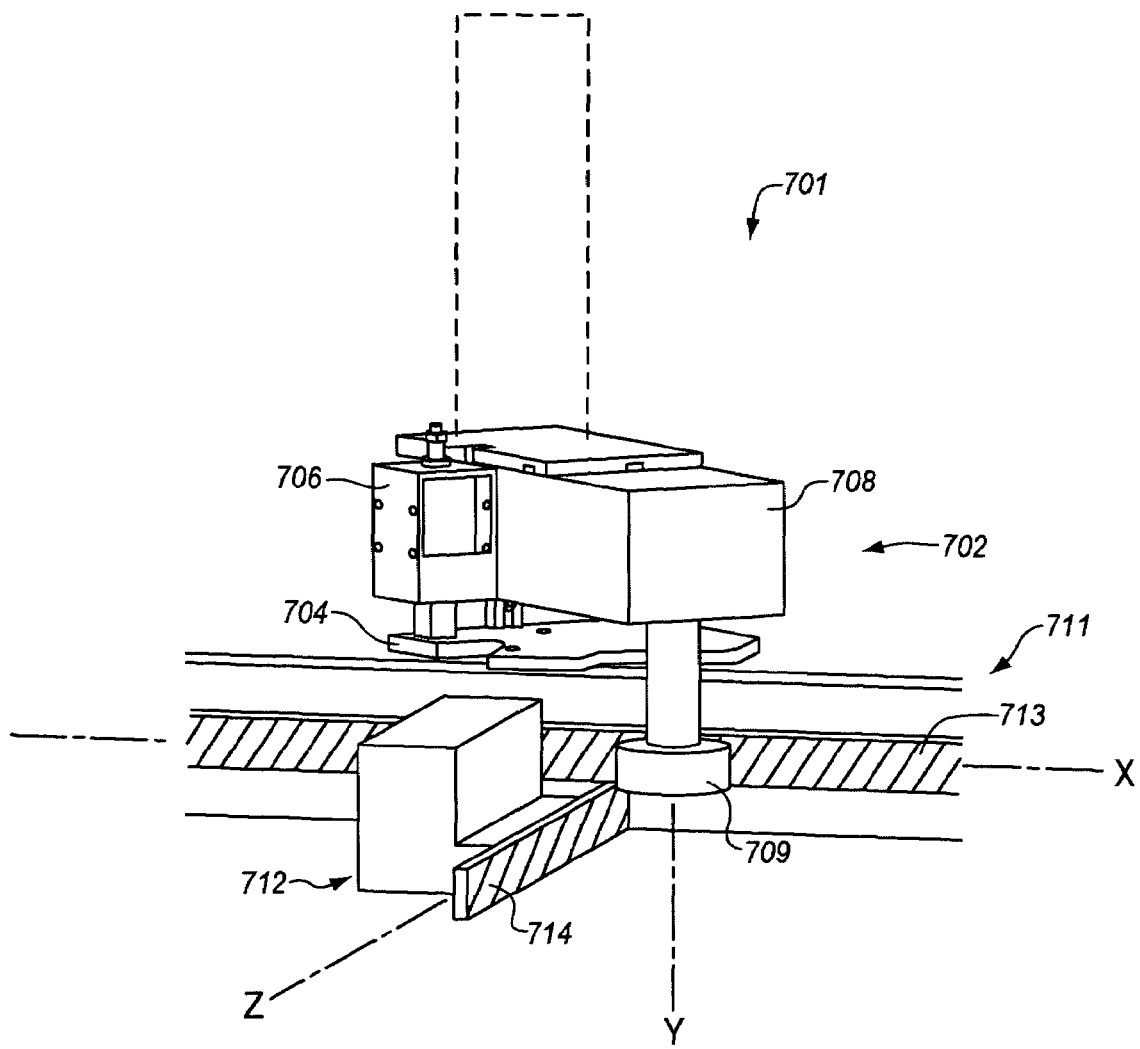
FIG. 7 illustrates an accessor and rails of a data storage library in an exemplary embodiment of the invention.

FIG. 7 illustrates an accessor 701 and rails 711-712 of a data storage library in an exemplary embodiment of the invention. Only the drive portion of the accessor 701 is shown for the sake of brevity. The other elements of the accessor are not shown, but would be connected to base 704 of drive system 120 and would extend upward in FIG. 7 as is illustrated by the dotted lines. The data storage library may be a tape library as shown in FIG. 1, or may comprise any other type of data storage library utilizing an accessor.

In FIG. 7, rail 712 is oriented at an angle with respect to rail 711. Rail 712 may be oriented at a right angle or any other desired angle, such as a forty-five degree angle, a sixty degree angle, etc. In some embodiments, rail 712 may intersect, abut, or adjoin rail 711 and may be affixed to rail 711. In other embodiments, the two rails 711-712, having the orientation described above, are not affixed to one another and may not even contact one another.

Rails 711-712 are not a single continuous rail, but two separate rails that are oriented with respect to one another to form an angle. The top surface of rail 711 and rail 712 may be co-planar. Rail 711 has a drive surface 713 illustrated as being positioned on a side of rail 711 so that the drive surface 713 is vertical. Rail 712 also has a drive surface 714 illustrated as being positioned on a side of rail 712 so that the drive surface 714 is vertical. A drive surface is defined herein as any surface capable of being engaged by a drive mechanism of an accessor so that the drive mechanism may exert force on the drive surface to provide motion to the accessor. Drive surfaces 713-714 may comprise smooth metal surfaces, rubber surfaces, racks (for a rack-and-pinion system), or any other desired surface.

Drive surface 713 has a longitudinal axis X. The longitudinal axis X is defined by drive surface 713 where the drive surfaces 713-714 are adjacent to one another, as the longitudinal axis X of drive surface 713 may change away from this adjacent area. Drive surface 714 has a corresponding longitudinal axis Z. The longitudinal axis Z is defined by drive surface 714 where the drive surfaces 713-714 are adjacent to one another, as the longitudinal axis Z of drive surface 714 may change away from this adjacent area. FIG. 7 also shows a perpendicular axis Y that is common to rails 711-712 and perpendicular to longitudinal axis X and longitudinal axis Z.

In this embodiment, the longitudinal axis X of drive surface 713 is at a different position on perpendicular axis Y than the longitudinal axis Z of drive surface 714. If rails 711-712 are configured horizontally, as shown in FIG. 7, then drive surface 713 may be described as having a vertical position that is higher on the perpendicular axis Y than the vertical position of the drive surface 714. The vertical position of drive surface 713 is higher than drive surface 714 in FIG. 7, but drive surface 713 may be lower than drive surface 714 in other embodiments.

Figure 13:
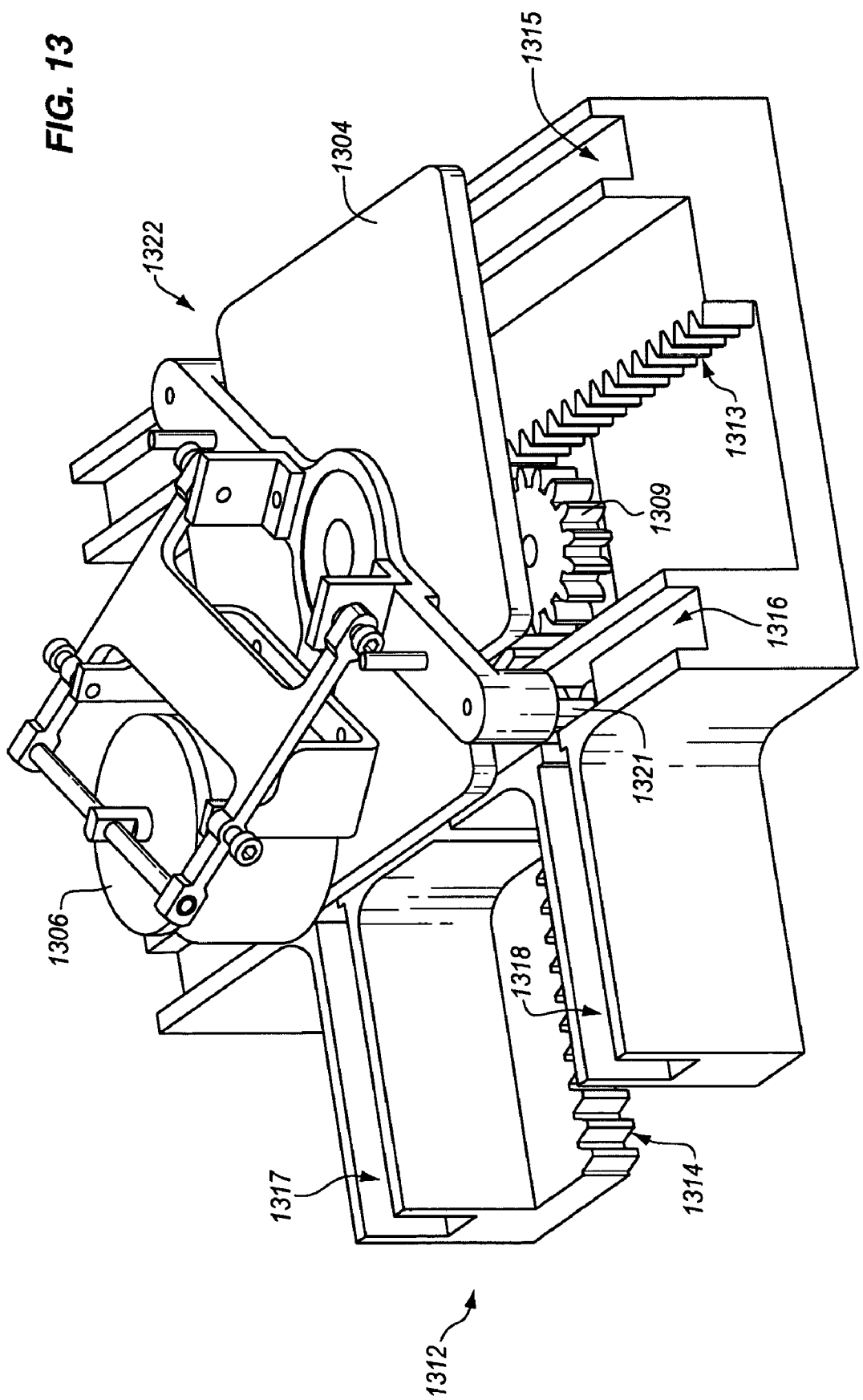
FIGS. 13-14 illustrate an alternative configuration for the accessor where the guide wheels of the accessor move with the drive system in an exemplary embodiment of the invention.

The vertical positioning of the drive surfaces 713-714 on the rails 711-712 is of particular importance at the point where the drive surfaces 713-714 are adjacent to one another (i.e., the point where the accessor 701 switches rails 711-712). Drive surface 713 is at a different vertical position than drive surface 714 at this point. Away from this point, drive surface 713 may be at the same vertical position as drive surface 714. An example of this is shown in FIG. 13.

Figure 12:
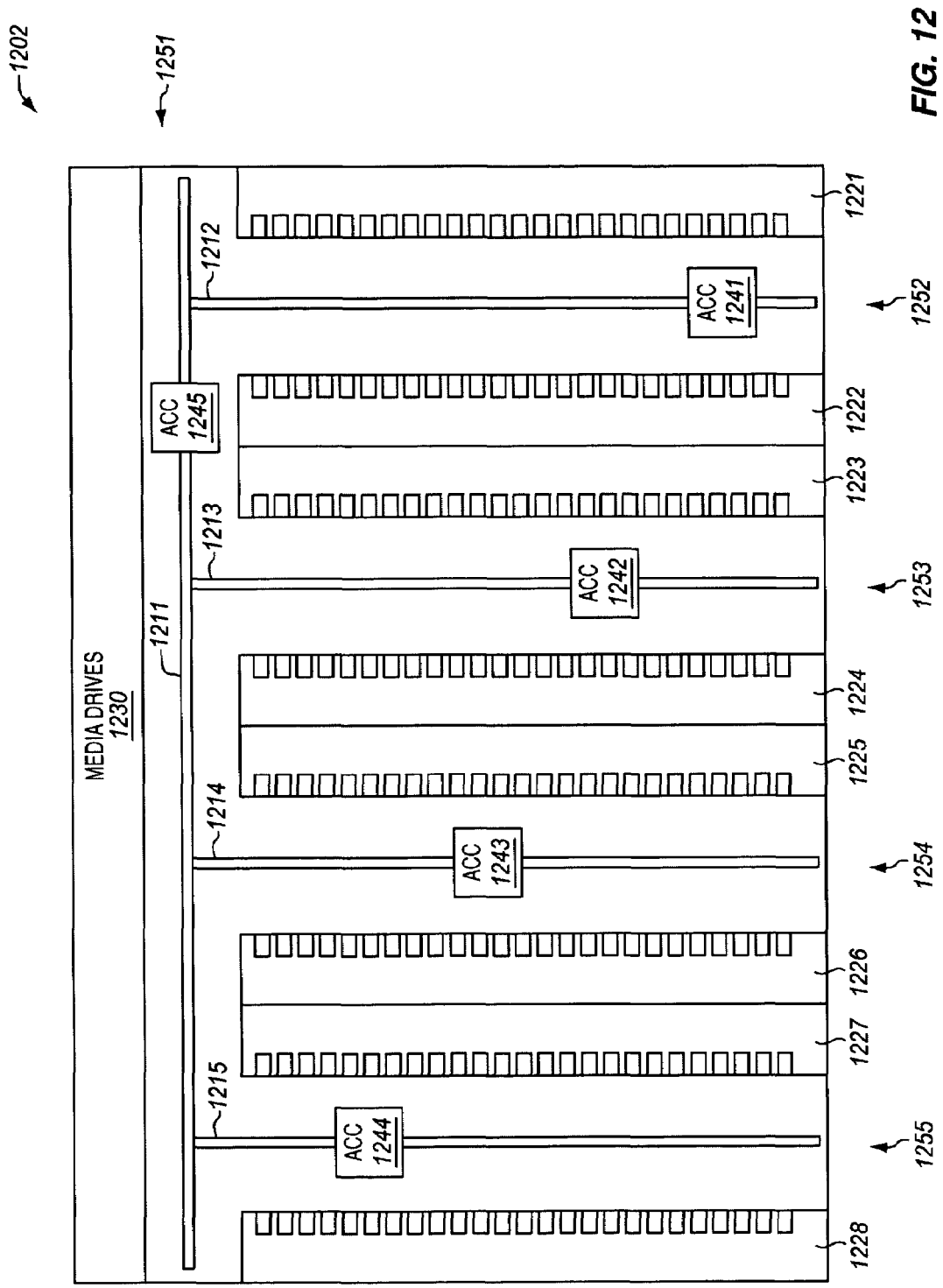
FIG. 12 is a top view of a data storage library implementing the accessor and the rails as described in FIGS. 7-11.

The data storage library of this embodiment may include a plurality of other rails (not shown) having a similar configuration as rail 712. A data storage library having such a configuration is shown in FIG. 12.

Figure 2:
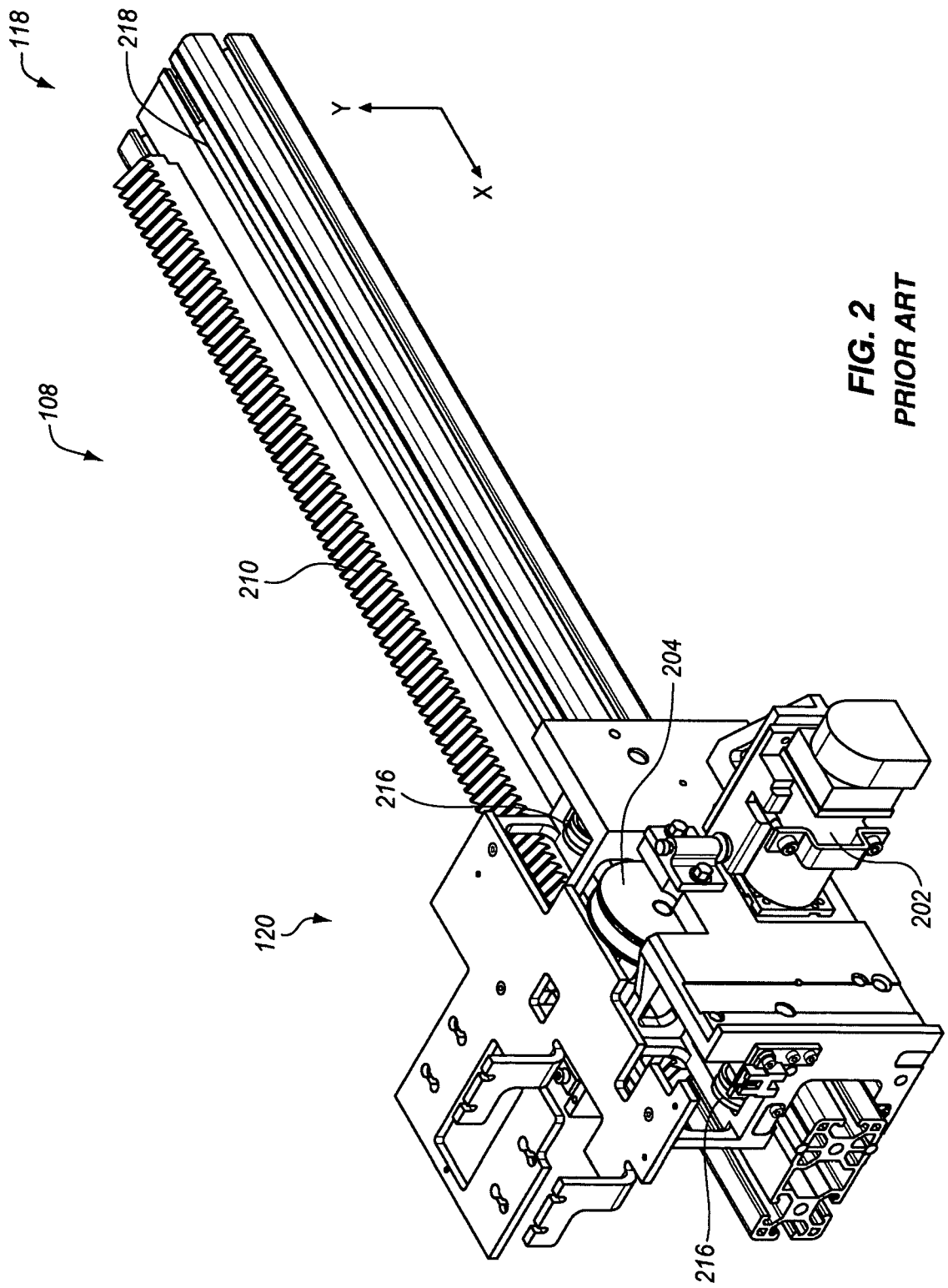
FIG. 2 illustrates an X-rail drive for an accessor in the prior art.
Figure 3:
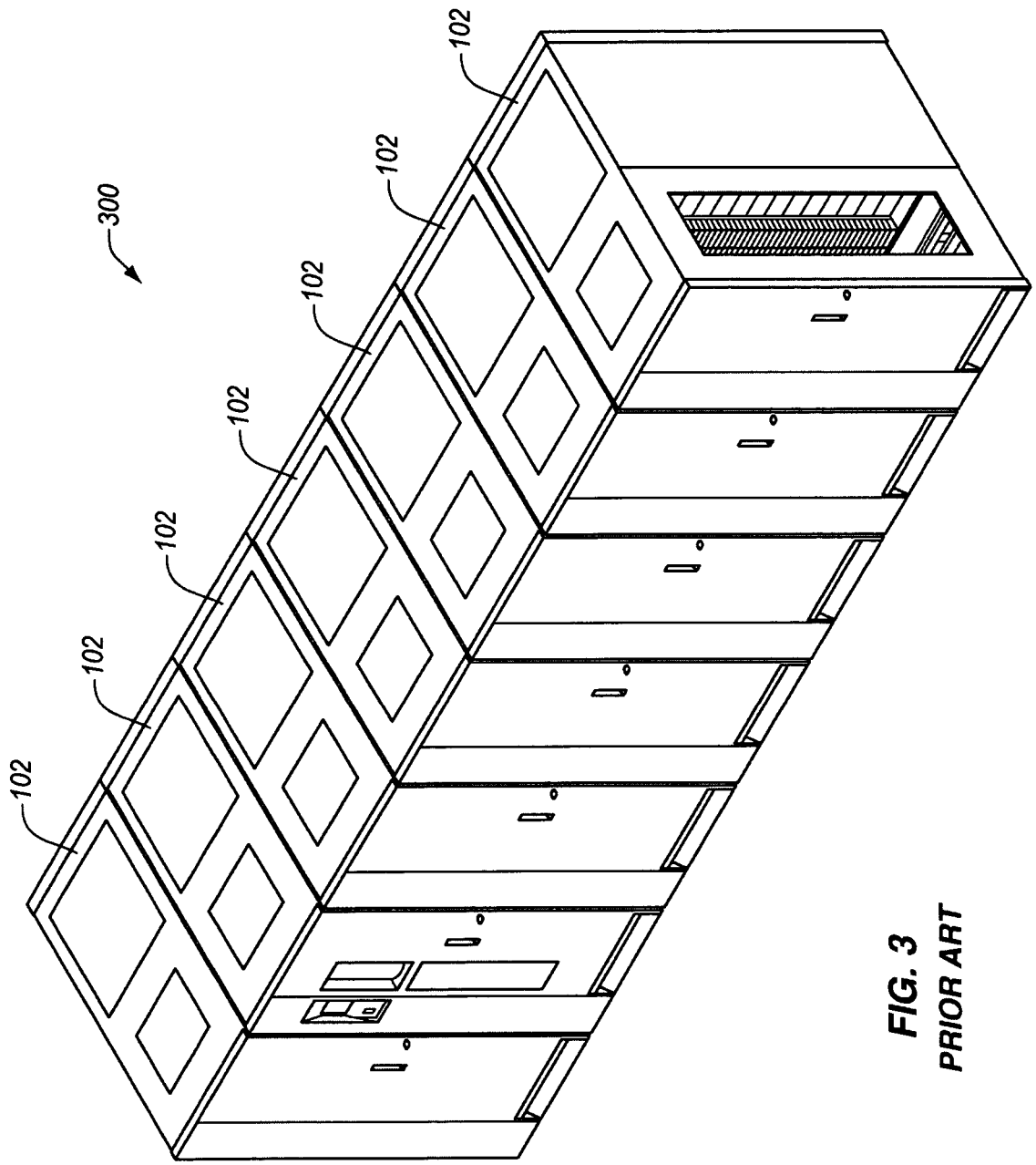
FIG. 3 illustrates a tape library comprising multiple storage frames in the prior art.
Figure 4:
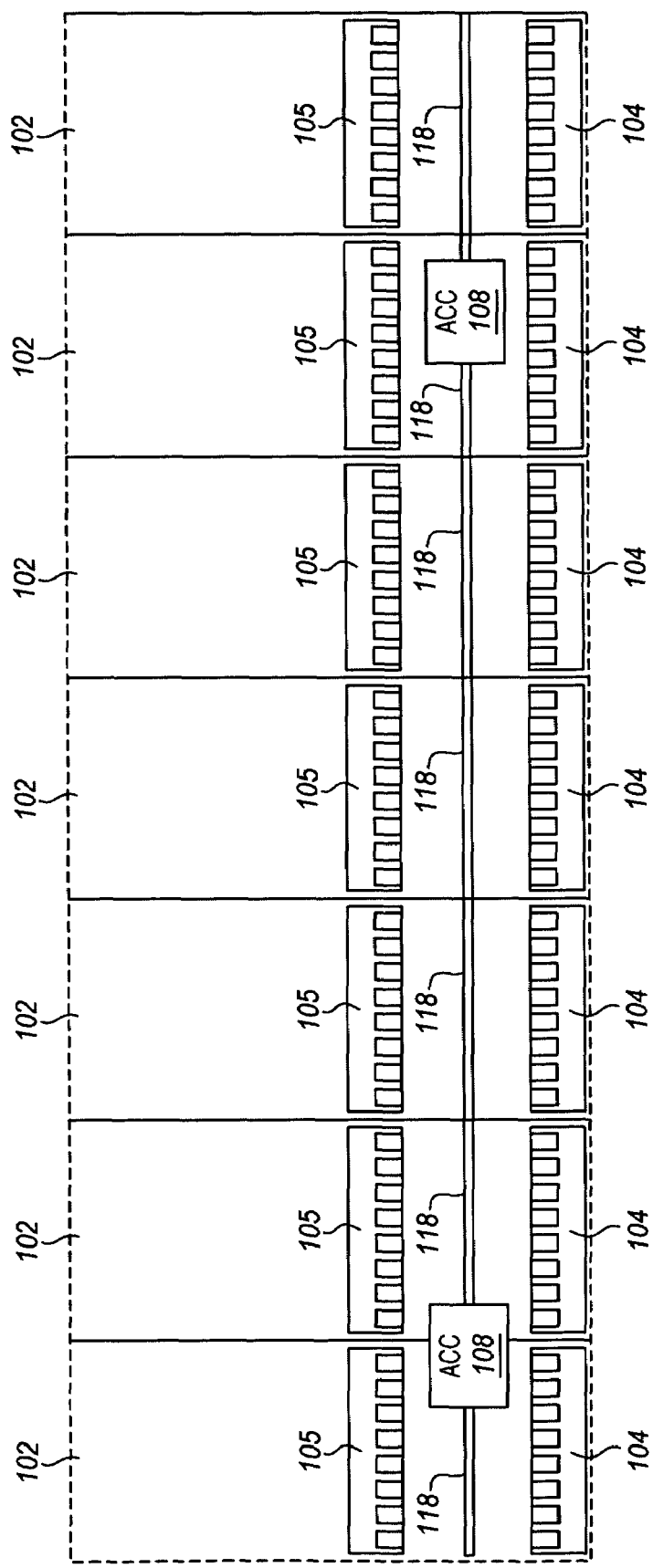
FIG. 4 is a top view of the tape library of FIG. 3 in the prior art.
Figure 6:
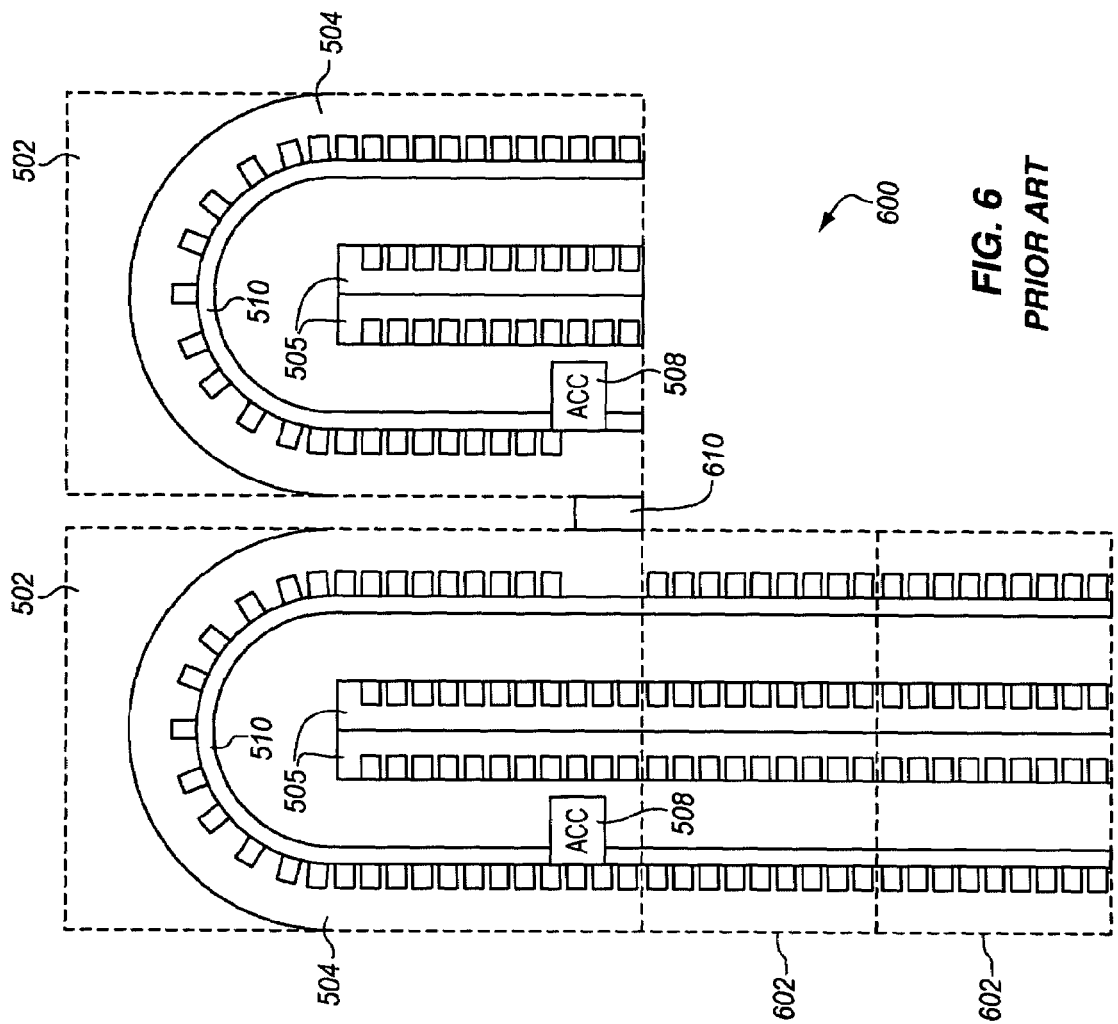
FIG. 6 is a top view of a tape library using U-shaped storage frames in the prior art.
Figure 5:
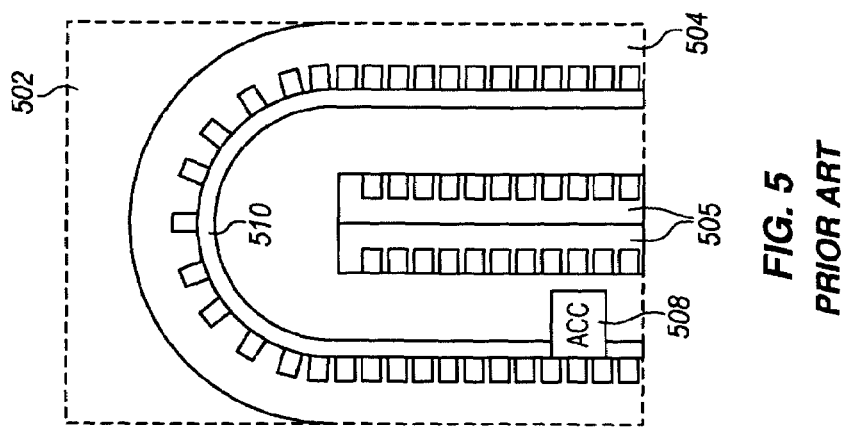
FIG. 5 is a top view of a U-shaped storage frame in the prior art.

In the embodiment shown in FIG. 7, the accessor 701 includes base 704, drive system 702, and switching mechanism 706. The drive system 702 may comprise the same or similar elements as the X-rail drive 120 described in FIG. 2. Drive system 702 includes a drive motor 708 or some other drive means. Drive system 702 also includes some type of drive mechanism 709 that is rotated or otherwise driven by the drive motor 708. Drive mechanism 709 may comprise a wheel, a sprocket, a pinion, or any other type of mechanism configured to exert force on a drive surface to impart motion to accessor 701.

Drive system 702 is moveable upon base 704, which is up and down in FIG. 7. Switching mechanism 706 is affixed to the drive system 702 and the base 704, and is configured to move the drive system 702 along the Y axis. Switching mechanism 706 may comprise a solenoid, an air or hydraulic cylinder, a motor, a linear actuator, or some other mechanism. In this embodiment, the whole drive system 702 is moved vertically by switching mechanism 706 relative to base 704 and rails 711-712. In other embodiments, individual members of the drive system 702 may be moved by switching mechanism 706. For instance, drive mechanism 709 may be moved independently of the other elements of drive system 702.

Responsive to the positioning of the drive mechanism 709 on the Y axis by the switching mechanism 706, movement of accessor 701 may be switched from rail 711 to rail 712, and vice-versa. For instance, if switching mechanism 706 positions drive mechanism 709 at a first position on the Y axis adjacent to drive surface 713, then drive mechanism 709 may engage drive surface 713 to move accessor 701 along rail 711. Because drive surface 714 is at a lower vertical position than drive surface 713, drive surface 714 is out of the way of drive mechanism 709. The other portions of rail 712 are also out of the way to allow accessor 701 to move along rail 711 in the direction of the X axis.

If accessor 701 needs to move along rail 712, then accessor 701 travels along rail 711 to be adjacent to rail 712 and drive surface 714. Switching mechanism 706 then switches the position of drive mechanism 709 to a second position on the Y axis that is adjacent to drive surface 714. In FIG. 7, switching mechanism 706 would lower drive mechanism 709 on the Y axis until drive mechanism 709 is adjacent to drive surface 714. Drive mechanism 709 may then engage drive surface 714 to move accessor 701 along rail 712. The movement of drive mechanism 709 between the drive surfaces 713-714 advantageously allows the accessor 701 to turn on angles, such as the right angle shown in FIG. 7.

Figure 8:
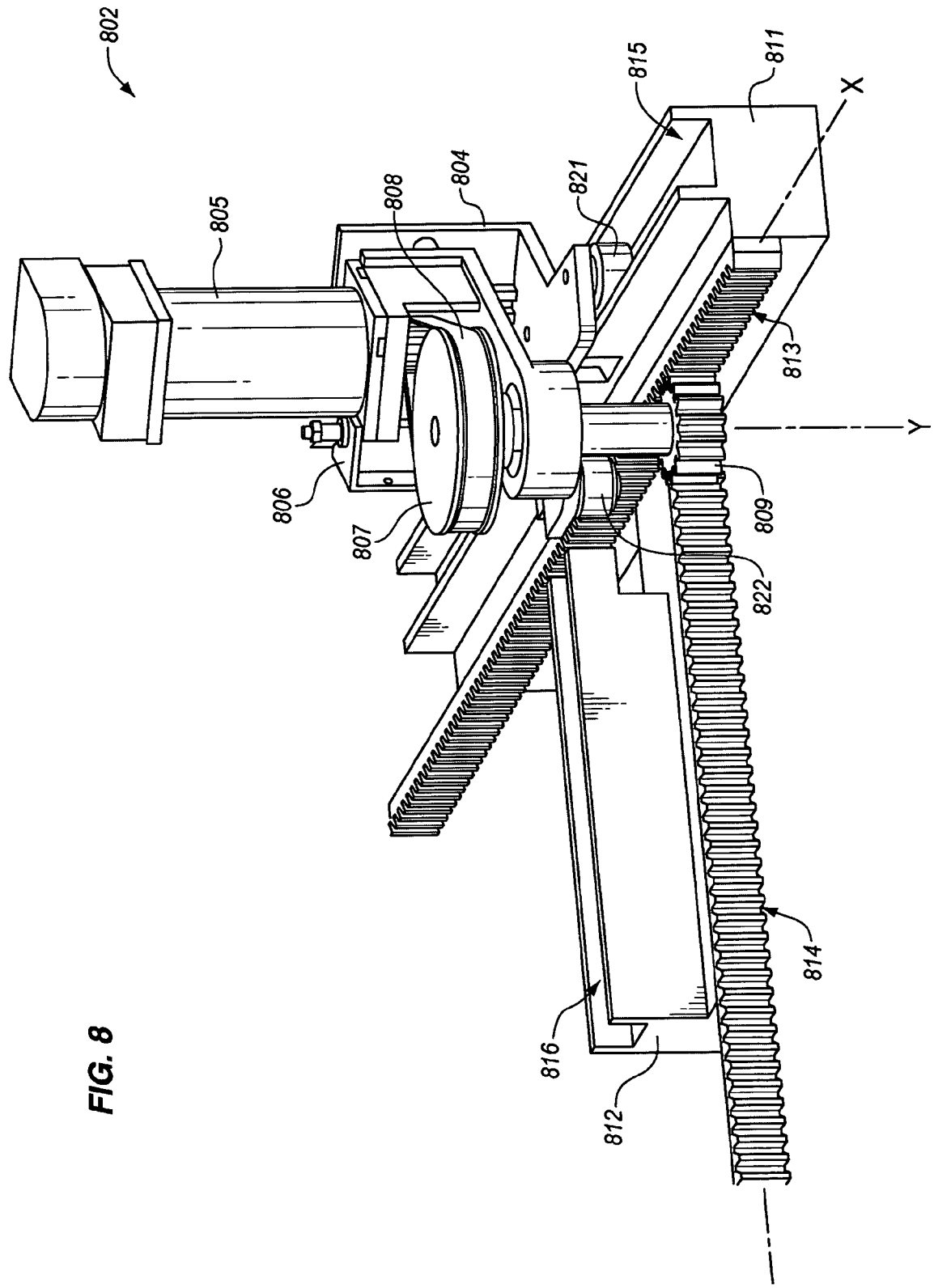
FIGS. 8-11 illustrate another embodiment of an accessor and rails of a data storage library.

FIGS. 8-11 illustrate another embodiment of an accessor 801 and rails 811-812 of a data storage library. FIG. 8 illustrates an accessor 801 and rails 811-812 of a data storage library in an exemplary embodiment of the invention. Only the drive portion of the accessor 801 is shown for the sake of brevity. The data storage library may be a tape library as shown in FIG. 1, or may comprise any other type of data storage library utilizing an accessor.

Rail 812 is oriented at an angle with respect to rail 811. Rail 812 may be oriented at another angle with respect to rail 811 in other embodiments. Rail 811 has a rack 813, illustrated as being positioned on a side of rail 811, and a guide slot 815. Rail 812 also has a rack 814, illustrated as being positioned on a side of rail 812, and a guide slot 816. A rack comprises a bar having teeth on one face for gearing with a pinion or worm gear to transform rotary motion to linear motion. A guide slot comprises any track or groove to guide an accessor when traveling along a rail.

Rails 811-812 are oriented horizontally in FIG. 8. Rack 813 of rail 811 has a longitudinal axis X. Rack 814 of rail 812 has a corresponding longitudinal axis Z. FIG. 8 also shows a perpendicular axis Y that is common to rails 811-812 and perpendicular to longitudinal axis X and longitudinal axis Z.

In this embodiment, the longitudinal axis X of rack 813 is at a different vertical position on perpendicular axis Y than the longitudinal axis Z of rack 814. More particularly, the vertical position of rack 813 is higher on the perpendicular axis Y than the vertical position of the rack 814. With the different vertical positioning of racks 813-814, a pinion 809 of the drive system 802 engages only one of the racks 813-814 at a time.

In the embodiment shown in FIG. 8, the accessor 801 includes base 804, drive system 802, switching mechanism 806, and guide wheels 821-822. Drive system 802 includes a drive motor 805 connected to a drive pulley 807 by a belt 808. The drive pulley 807 connects to pinion 809 by a shaft. The drive system 802 is moveable upon base 804 along the Y axis relative to base 804 and rails 811-812. Switching mechanism 806 is affixed to the drive system 802 and base 804, and is configured to move the drive system 802 along the Y axis. Switching mechanism 806 may comprise a solenoid, an air or hydraulic cylinder, a motor, a linear actuator, or some other mechanism.

Guide wheel 821 engages guide slot 815 of rail 811. Guide wheel 821 guides accessor 801 when moving along rail 811. Guide wheel 822 is not engaging a guide slot in FIG. 8 and is used to engage guide slot 816 of rail 812 when accessor 801 switches rails. The guide wheels 821-822 and guide slots 815-816 are just one example, and the guide wheels 821-822 and guides slots 815-816 may have many desired configurations.

The configuration of accessor 801 and rails 811-812 allows accessor 801 to switch between rails 811-812 and turn 90° corners. Assume that switching mechanism 806 positions pinion 809 at a first position on the Y axis to engage rack 813. Drive motor 805 may then turn pinion 809 on rack 813 to move accessor 801 along rail 811. Because rack 814 is at a lower vertical position than rack 813, rack 814 is out of the way of pinion 809 when accessor 801 is moving along rail 811. The other portions of rail 812 are also out of the way of rack 813 to allow accessor 801 to move along rail 811 in the direction of the X axis.

Figure 9:
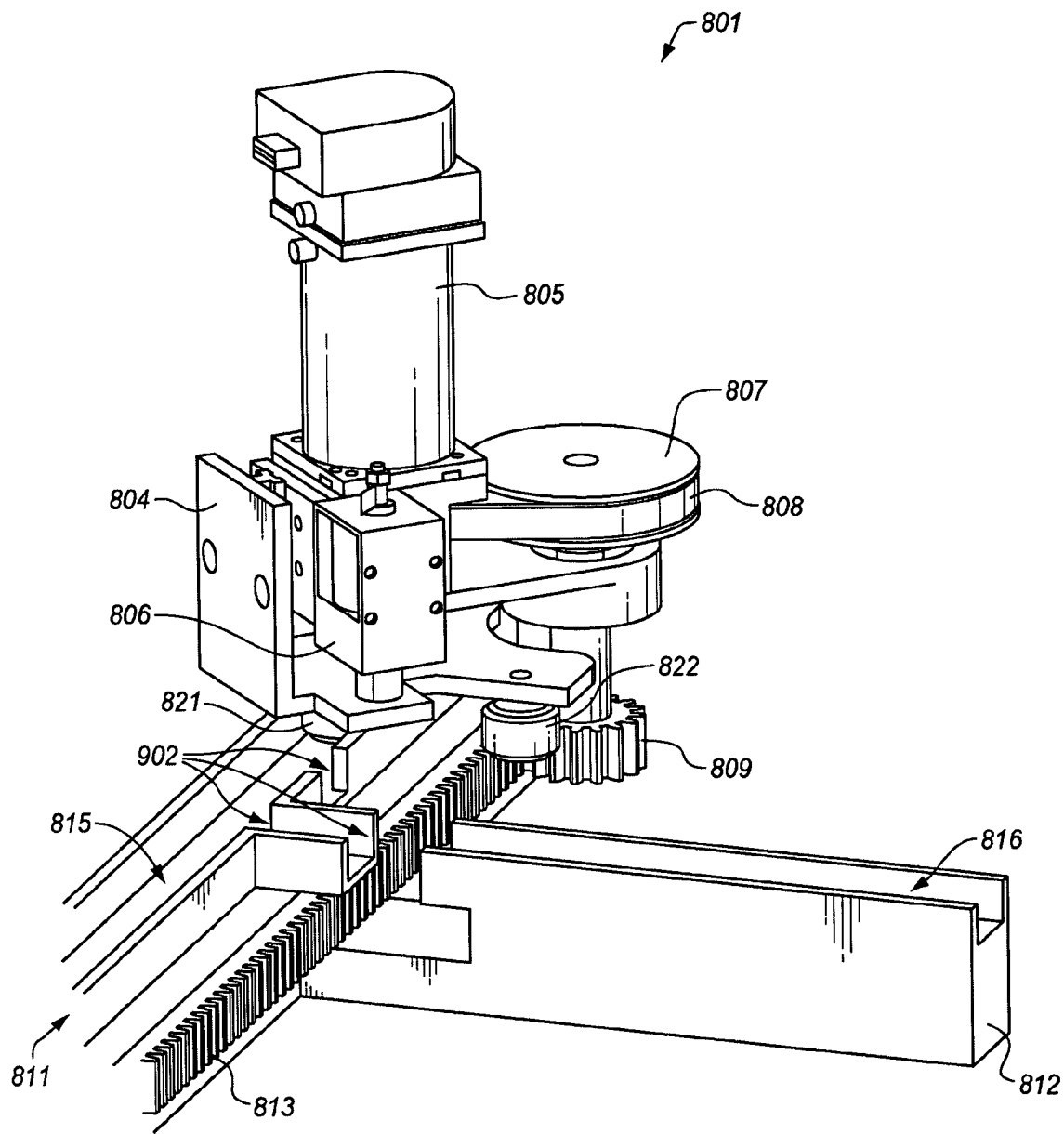

FIG. 9 illustrates another view of accessor 801 and rails 811-812. As shown in FIG. 9, guide slots 815-816 include openings 902. The openings 902 allow the guide wheels 821-822 to disengage from guide slot 815 and engage guide slot 816 when accessor 801 is switching rails. For instance, guide wheel 822 will enter and engage guide slot 816 through one of the openings 902, while guide wheel 821 will disengage guide slot 815 through one of the openings 902.

Figure 10:
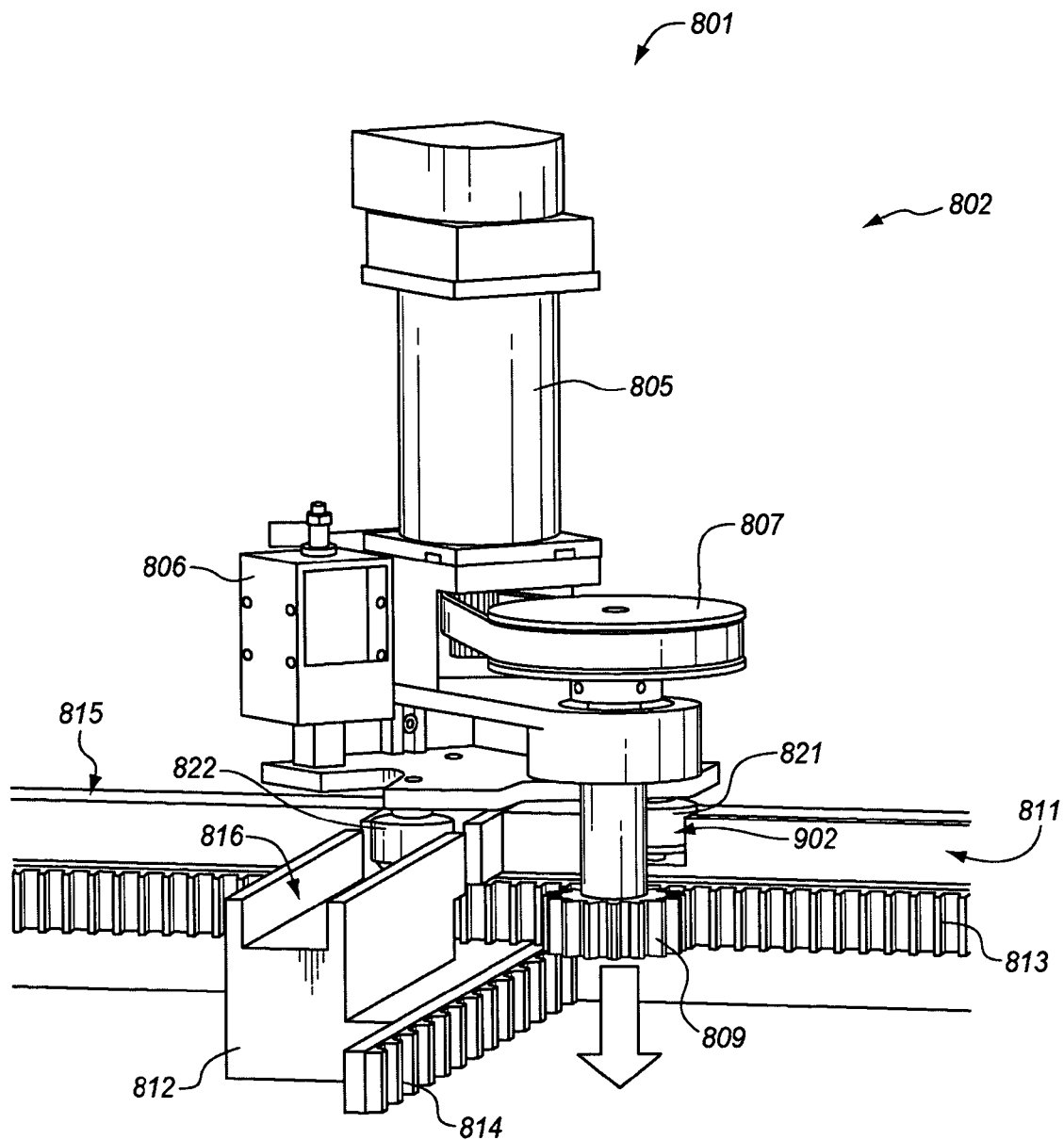
Figure 11:
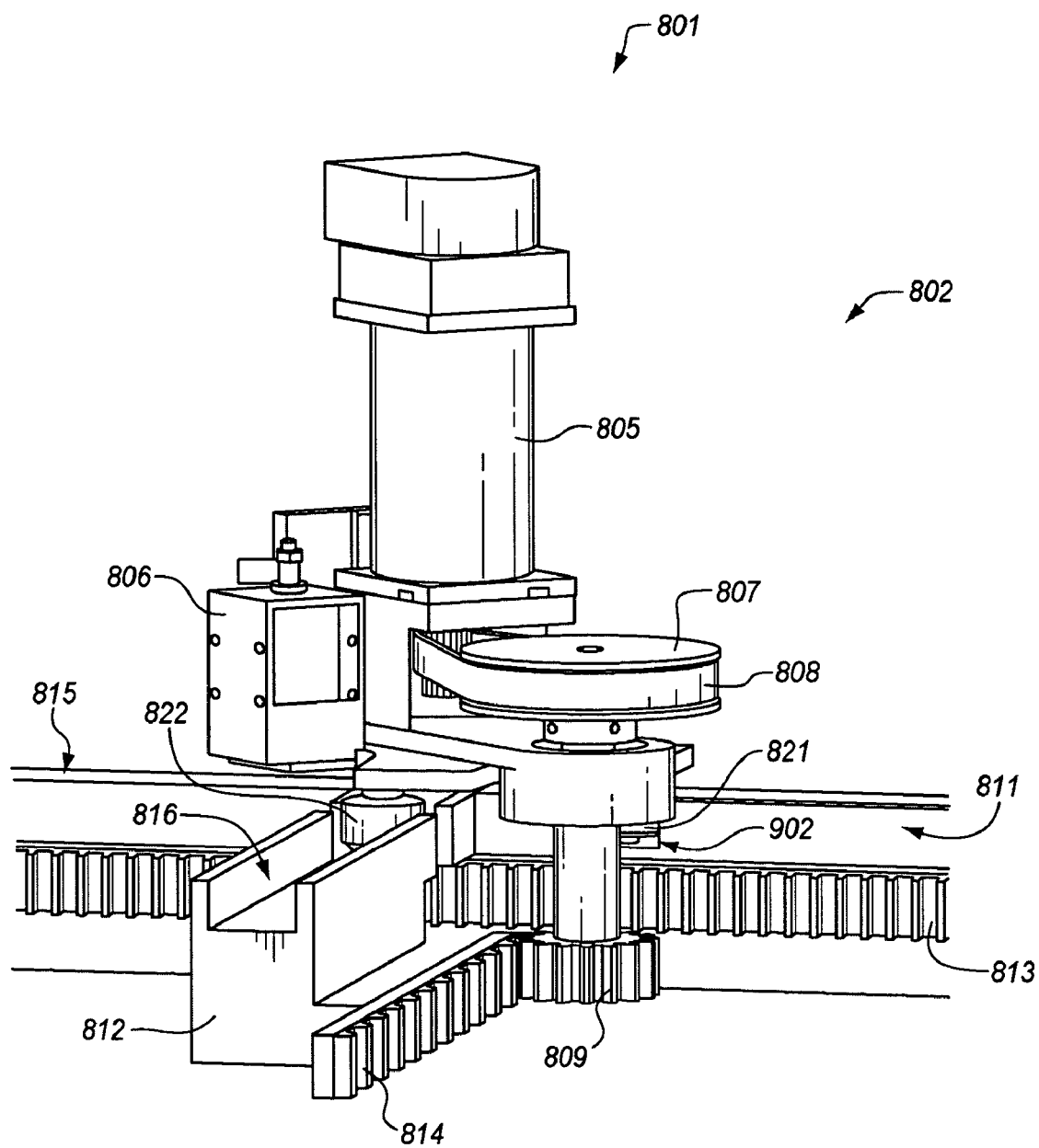

FIG. 10 illustrates another view of accessor 801 and rails 811-812. When at this position on rail 811, accessor 801 may switch rails. In FIG. 10, accessor 801 is moved along rail 811 until the pinion 809 is adjacent to rack 814 and guide wheels 821-822 are adjacent to the openings 902 in the guide slots 815-816. Switching mechanism 806 may then lower the pinion 809 to a second position on the Y axis to engage rack 814 instead of rack 813, as is illustrated by the arrow. FIG. 11 illustrates the pinion 809 engaging rack 814. With the pinion 809 positioned as in FIG. 11, drive motor 805 may then turn pinion 809 on rack 814 to move accessor 801 along rail 812.

FIG. 12 illustrates a data storage library 1200 implementing accessors and rails as described in FIGS. 7-11. The view in FIG. 12 is a top view of data storage library 1202. Data storage library 1202 includes a plurality of rails 1211-1215 located between a plurality of storage shelves 1221-1228. Rail 1211 spans the width of the data storage library 1202 to form a first linear row 1251. Rails 1212-1215 each abut rail 1211 at right angles on different points along rail 1211. Rails 1212-1215 thus extend out at substantially 90° angles to form a comb-like structure for rails 1211-1215. Storage shelves 1221-1228 are located on either side of rails 1212-1215 to form the branches 1252-1255 of the data storage library 1202.

Data storage library 1202 includes a plurality of accessors 1241-1245 that are configured to travel along the rails 1211-1215 to access cartridges stored on the storage shelves 1221-1228. The cartridges may comprise tape cartridges or another other type of storage media. The accessors 1241-1245 transport the cartridges between the storage shelves 1221-1228 and the media drives 1230 of the data storage system 1202.

With the configuration of the rails and the accessors described in FIGS. 7-11, the accessors 1241-1245 in FIG. 12 are able to turn angled corners and switch rails 1211-1215. The capability of the accessors 1241-1245 to switch rails 1211-1215 allows for multiple accessors 1241-1245 that can pass one another along the rails 1211-1215. Because data storage library 1202 has multiple branches 1252-1255, any accessor 1241-1245 can advantageously move itself out of the way in one of the branches 1252-1255 to allow other accessors to access any cartridge in the data storage library 1202 without a pass-through mechanism. The switching mechanism for switching rails is also advantageously implemented in accessors 1241-1245 to avoid a single point of failure. The capability of the accessors 1241-1245 to switch rails 1211-1215 also allows the data storage library 1202 to advantageously grow in two dimensions. In FIG. 12, the branches 1252-1255 of the data storage library 1202 can be expanded downward in FIG. 12. The branches 1252-1255 can be expanded independently to different lengths to allow more flexibility in data storage library 1202. The data storage library 1202 may also expand side-by-side by adding more storage frames to the left or right in FIG. 12 along linear row 1251. The capability of the accessors 1241-1245 to switch rails 1211-1215 also allows the storage slots of the storage shelves 1221-1228 to be put very close together (back-to-back) where if a large turning radius was required, more spacing would be required. This advantageously allows the cartridge density of data storage library to increase.

Figure 14:
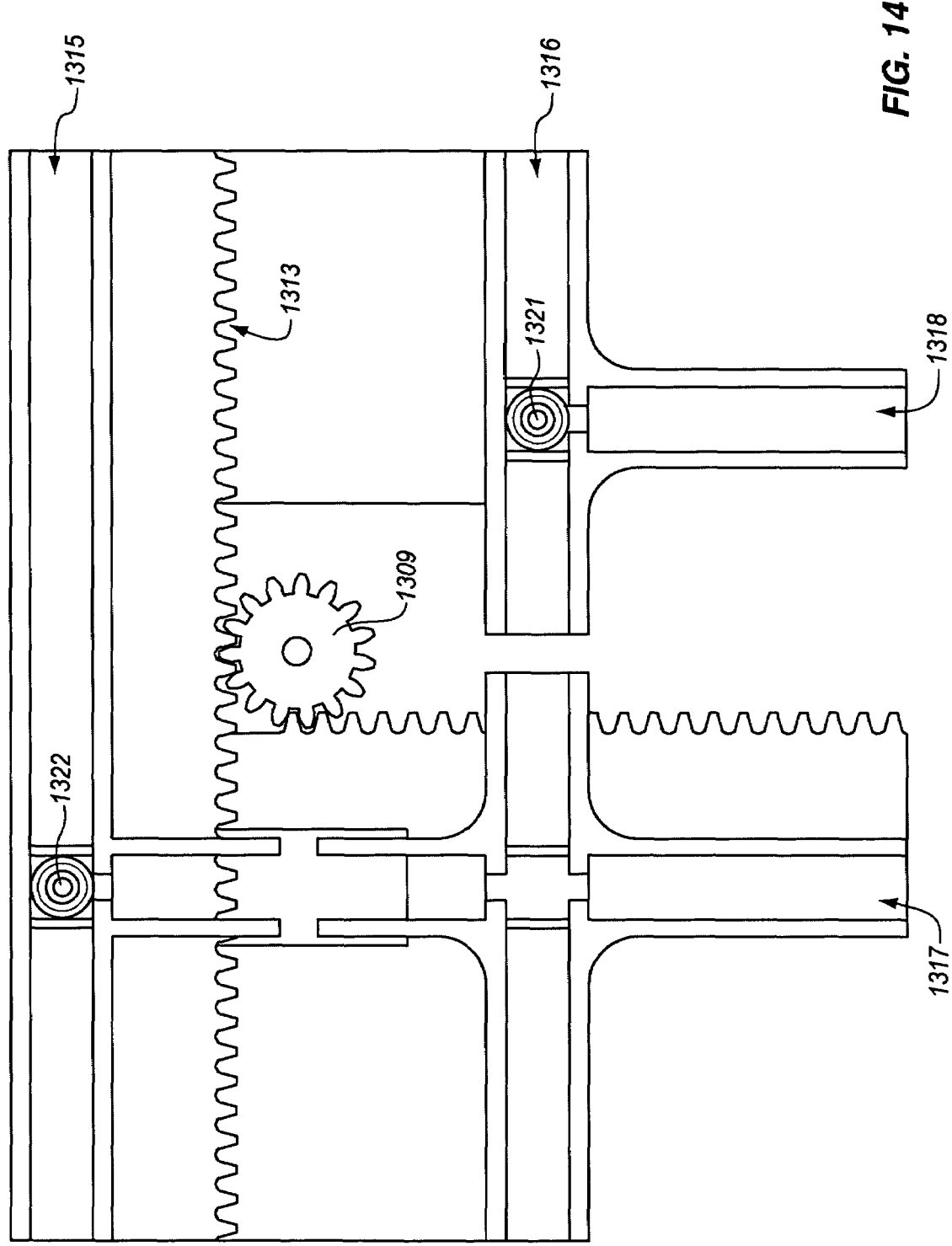

FIGS. 13-14 illustrate an alternative configuration for the accessor where the guide wheels of the accessor move with the drive system in an exemplary embodiment of the invention. In FIG. 13, rail 1311 includes a rack 1313 and two guide slots 1315-1316. Similarly, rail 1312 includes a rack 1314 and two guide slots 1317-1318. In this embodiment, switching mechanism 1306 moves guide wheels 1322 along with pinion 1309 and other elements of a drive system (not shown). Switching mechanism 1306 raises pinion 1309 to engage rack 1313 of rail 1311 and at the same time raises guide wheels 1321-1322 to engage guide slots 1315-1316. The accessor may then move along rail 1311. To switch the accessor to rail 1312, switching mechanism 1306 lowers pinion 1309 to engage rack 1314 of rail 1312 and at the same time lowers guide wheels 1321-1322 to engage guide slots 1317-1318. The accessor may then move along rail 1312. FIG. 14 illustrates a top view of the rails 1311-1312.

Figure 15:
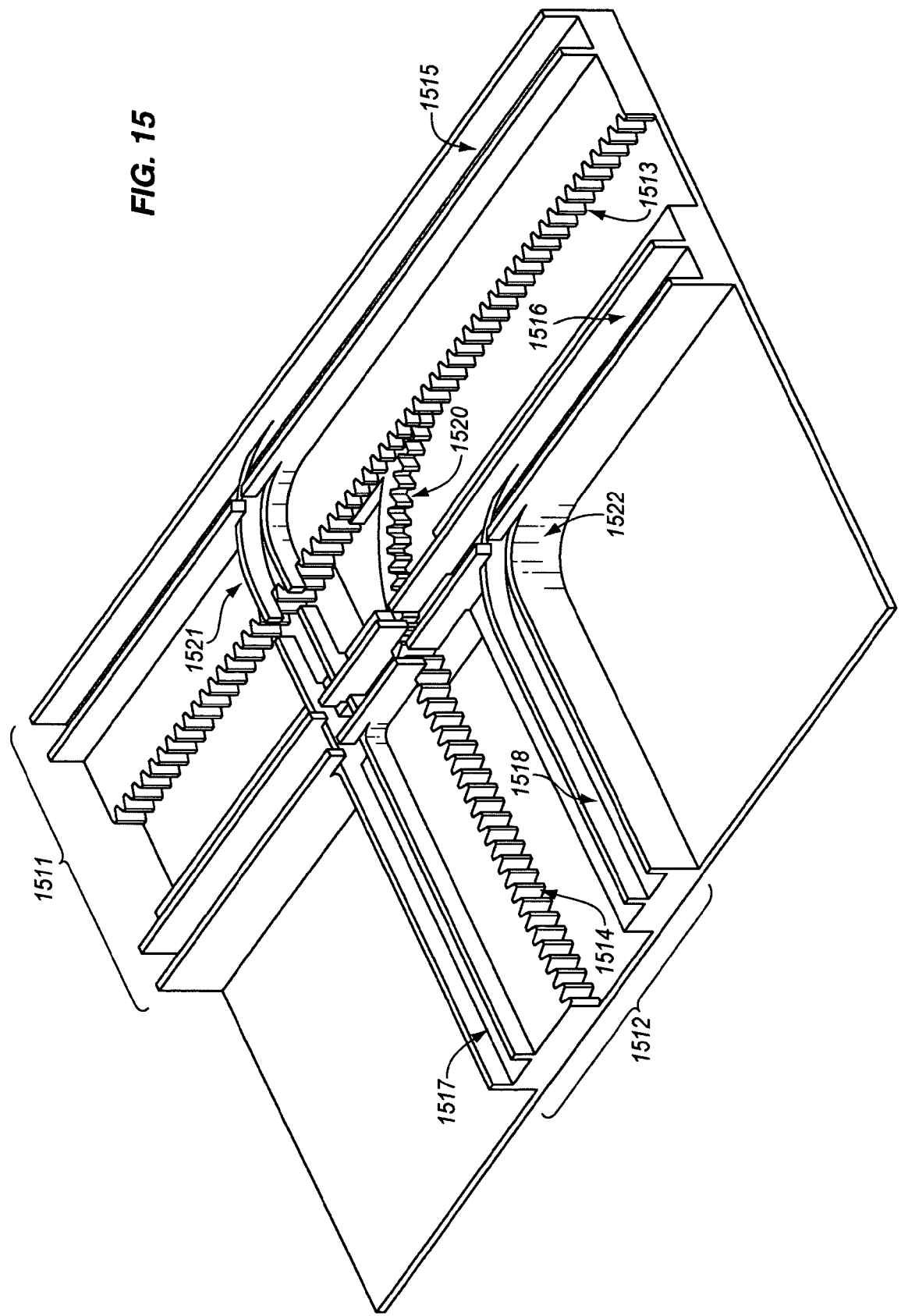
FIGS. 15-16 illustrate an alternative configuration for the rails of a data storage library in another exemplary embodiment of the invention.
Figure 16:
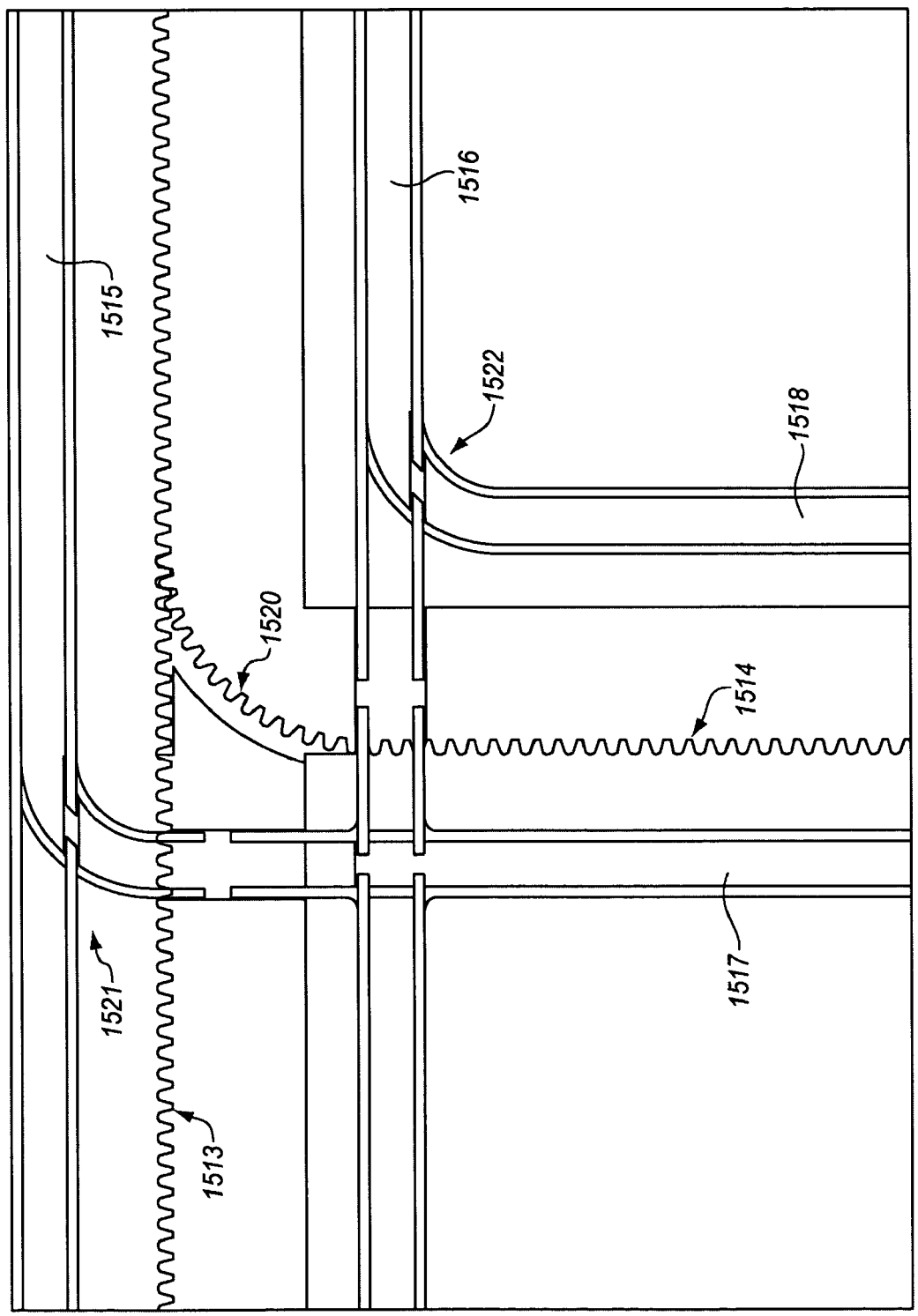

FIGS. 15-16 illustrate an alternative configuration for the rails 1511-1512 of a data storage library in another exemplary embodiment of the invention. In FIG. 15, rail 1511 includes a rack 1513 and two guide slots 1515-1516. Similarly, rail 1512 includes a rack 1514 and two guide slots 1517-1518. In this embodiment, rail 1512 also includes a curved section 1520 to provide a more gradual turn along the angle between rail 1511 and rail 1512. The guide slots 1515-1518 include similar curved sections 1521-1522.

At the point where an accessor would switch from rail 1511 to rail 1512, rack 1513 is at a higher vertical plane than rack 1514. The curved section 1520 is on the same plane as rack 1514. The drive mechanism of the accessor may be moved vertically any time while engaging rack 1513, even while moving. If the drive mechanism is in a lowered position when approaching the curved section 1520, then the drive mechanism will follow the curved section 1520 and turn the accessor onto rail 1512. If the drive mechanism is in a raised position when approaching the curved section 1520, then the drive mechanism will pass the curved section 1520 and stay on rail 1511. Switching of rails 1511-1512 may thus be performed more quickly. FIG. 16 illustrates a top view of the rails 1511-1512.

The above description is of data storage libraries. The invention described herein applies equally to any robotic system that uses a robotic device to move along rails. A data storage library is just one embodiment of a robotic system, and an accessor of a data storage library is just one embodiment of a robotic device in a robotic system.

We claim:
1. A data storage library, comprising:
a first rail having a first drive surface;
a second rail having a second drive surface and oriented at an angle with the first rail;
wherein the longitudinal axis of the first drive surface is at a first position and the longitudinal axis of the second drive surface is at a second position on a perpendicular axis that is perpendicular to the longitudinal axis of the first drive surface and the longitudinal axis of the second drive surface; and
an accessor comprising:
a drive mechanism configured to engage the first drive surface of the first rail to move the accessor along the first rail, and to engage the second drive surface of the second rail to move the accessor along the second rail; and
a switching mechanism configured to move the drive mechanism along the perpendicular axis, wherein the switching mechanism positions the drive mechanism at the first position on the perpendicular axis to engage the drive mechanism with the first drive surface of the first rail, and positions the drive mechanism at the second position on the perpendicular axis to engage the drive mechanism with the second drive surface of the second rail; and
the accessor comprising a guide wheel configured to engage a guide slot on the first rail to guide the accessor when moving along the first rail, and engage a guide slot on the second rail to guide the accessor when moving along the second rail; wherein the guide slot on the first rail includes an opening to allow the guide wheel to disengage from the guide slot on the first rail and engage the guide slot on the second rail.

* * * * *